(12) United States Patent
Asahara et al.

(10) Patent No.: US 7,103,474 B1
(45) Date of Patent: Sep. 5, 2006

(54) NAVIGATION DEVICE

(75) Inventors: Tomoyuki Asahara, Hyogo (JP); Kiyoko Ueno, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 519 days.

(21) Appl. No.: 10/030,689

(22) PCT Filed: Jun. 8, 2000

(86) PCT No.: PCT/JP00/03731

§ 371 (c)(1),
(2), (4) Date: Jan. 14, 2002

(87) PCT Pub. No.: WO01/94886

PCT Pub. Date: Dec. 13, 2001

(51) Int. Cl.
*G01C 21/00* (2006.01)
*G08G 9/00* (2006.01)

(52) U.S. Cl. .................. 701/210; 701/117; 340/905

(58) Field of Classification Search ............... 701/210, 701/117, 200, 209, 201, 208, 211; 340/995.19, 340/995.21, 905
See application file for complete search history.

(56) References Cited

U.S. PATENT DOCUMENTS

| | | | |
|---|---|---|---|
| 5,184,303 A | 2/1993 | Link | 364/449 |
| 5,220,507 A * | 6/1993 | Kirson | 701/202 |
| 5,369,588 A | 11/1994 | Hayami et al. | 340/995.19 |
| 5,787,383 A * | 7/1998 | Moroto et al. | 701/210 |
| 5,802,492 A | 9/1998 | DeLorme et al. | 455/456.5 |
| 5,911,773 A * | 6/1999 | Mutsuga et al. | 701/200 |
| 5,928,307 A * | 7/1999 | Oshizawa et al. | 701/210 |
| 5,931,888 A * | 8/1999 | Hiyokawa | 701/208 |
| 6,061,629 A | 5/2000 | Yano et al. | 701/209 |
| 6,134,501 A * | 10/2000 | Oumi | 701/209 |
| 6,321,161 B1 * | 11/2001 | Herbst et al. | 701/210 |

FOREIGN PATENT DOCUMENTS

| | | |
|---|---|---|
| JP | 5-196473 A | 8/1993 |
| JP | 7-113649 | 5/1995 |
| JP | 7-134795 A | 5/1995 |
| JP | 8-128845 A | 5/1996 |
| JP | 9-89580 A | 4/1997 |
| JP | 11-72341 | 3/1999 |
| JP | 11-83519 A | 3/1999 |

OTHER PUBLICATIONS

NVA-N751A/AS, Advanced Route Guidance Navigation System User's Guide V3.1 p. 46-47, month is not available.

* cited by examiner

*Primary Examiner*—Dalena Tran
(74) *Attorney, Agent, or Firm*—Birch, Stewart, Kolasch & Birch, LLP

(57) ABSTRACT

A bypass setting for a section connecting arbitrary guide points is received by a bypass setting receiving section 6 and a route to a destination is re-searched by a route searching means 3 in accordance with the set result.

10 Claims, 5 Drawing Sheets

FIG.5

| BYPASS PLACE NAME | BYPASS STATUS |
|---|---|
| POINT A | [PERFORM]   NON-PERFORMANCE |
| SECTION B | PERFORM   [NON-PERFORMANCE] |
| POINT C | [PERFORM]   NON-PERFORMANCE |

FIG.6

| BYPASS PLACE NAME | BYPASS STATUS | BYPASS DATE/TIME |
|---|---|---|
| POINT A | [PERFORM]   NON-PERFORMANCE | 2000.3.1   8:23 |
| SECTION B | PERFORM   [NON-PERFORMANCE] | 2000.5.5   14:38 |
| POINT C | [PERFORM]   NON-PERFORMANCE | 2000.6.15   12:03 |

US 7,103,474 B1

NAVIGATION DEVICE

This application is the national phase under 35 U.S.C. § 371 of PCT International Application No. PCT/JP00/03731 which has an International filing date of Jun. 8, 2000 which designated the United States of America.

TECHNICAL FIELD

The present invention relates to a navigation device which searches a route to a destination.

BACKGROUND ART

When a destination is set, a navigation device searches an optimal route from a current position to the destination and performs guiding to the destination by indicating the route.

In order to assist in understanding the route to the destination, the navigation device has the function of listing guide points (for example, intersections on the route) and displaying the direction of traffic at those guide points for example.

However, it is sometimes the case that a user wishes to bypass a certain guide point for some reason. For this purpose, the navigation device has the function of re-searching the route to bypass the guide point when the user sets a guide point to be bypassed.

For example, when there are ten guide points and a section from the third to the seventh of these guide points undergoes chronic traffic congestion, the route is re-searched in order to bypass the fourth, fifth and sixth guide points if those guide points are respectively designated as guide points to be bypassed.

Since the conventional navigation device is constituted as above, the route is re-searched in order to bypass guide points when a user designates the guide points which should be bypassed. However, the problem arises that a cumbersome operation must be performed in order to designate a plurality of guide points individually when it is desired to bypass a section across the plurality of guide points.

The present invention is proposed to solve the above problem and has the object of providing a navigation device which can search a route to bypass a section connecting arbitrary guide points without performing a cumbersome setting operation.

DISCLOSURE OF THE INVENTION

A navigation device according to the present invention receives a bypass setting for a section connecting arbitrary guide points and re-searches a route to a destination in accordance with the result of the setting.

In this manner, the advantageous effect is obtained that it is possible to search a route which bypasses the section connecting the arbitrary guide points without performing a cumbersome setting operation.

The navigation device according to the present invention may be adapted to receive a bypass setting for arbitrary guide points.

In this manner, the advantageous effect is obtained that it is possible to search a route which avoids the arbitrary guide points.

The navigation device according to the present invention may be provided with a storage means for storing the bypass settings received by a receiving means. When a route searching means searches a route to the destination, reference is made to the bypass settings stored in the storage means.

In this manner, the advantageous effect is obtained that a single bypass setting makes it possible to search a route which bypasses the section connecting the arbitrary guide points without performing the bypass setting on subsequent occasions.

The navigation device according to the present invention may be adapted to indicate the bypass settings stored in the storage means and to receive a modification to the bypass settings.

In this manner, the advantageous effect is obtained that it is possible to modify the status of the bypass in response to the condition.

The navigation device according to the present invention may be adapted to indicate the bypass settings stored in the storage means before the route searching means searches a route to a destination.

In this manner, the advantageous effect is obtained that it is possible to confirm bypass conditions before searching the route to the destination.

The navigation device according to the present invention may be adapted so that the storage means adds the date and time of the bypass to the bypass setting and stores it.

In this manner, the advantageous effect is obtained that it is possible to indicate the status of the bypass considering the date and time of previous bypass settings.

BRIEF DESCRIPTION OF THE DRAWINGS

FIG. 5 describes the details of bypass settings.

FIG. 6 describes the details of bypass settings.

BEST MODE OF CARRYING OUT THE INVENTION

In order to describe the invention in greater detail, the preferred embodiments will be outlined below with reference to the accompanying figures.

EMBODIMENT 1

Figure 1:
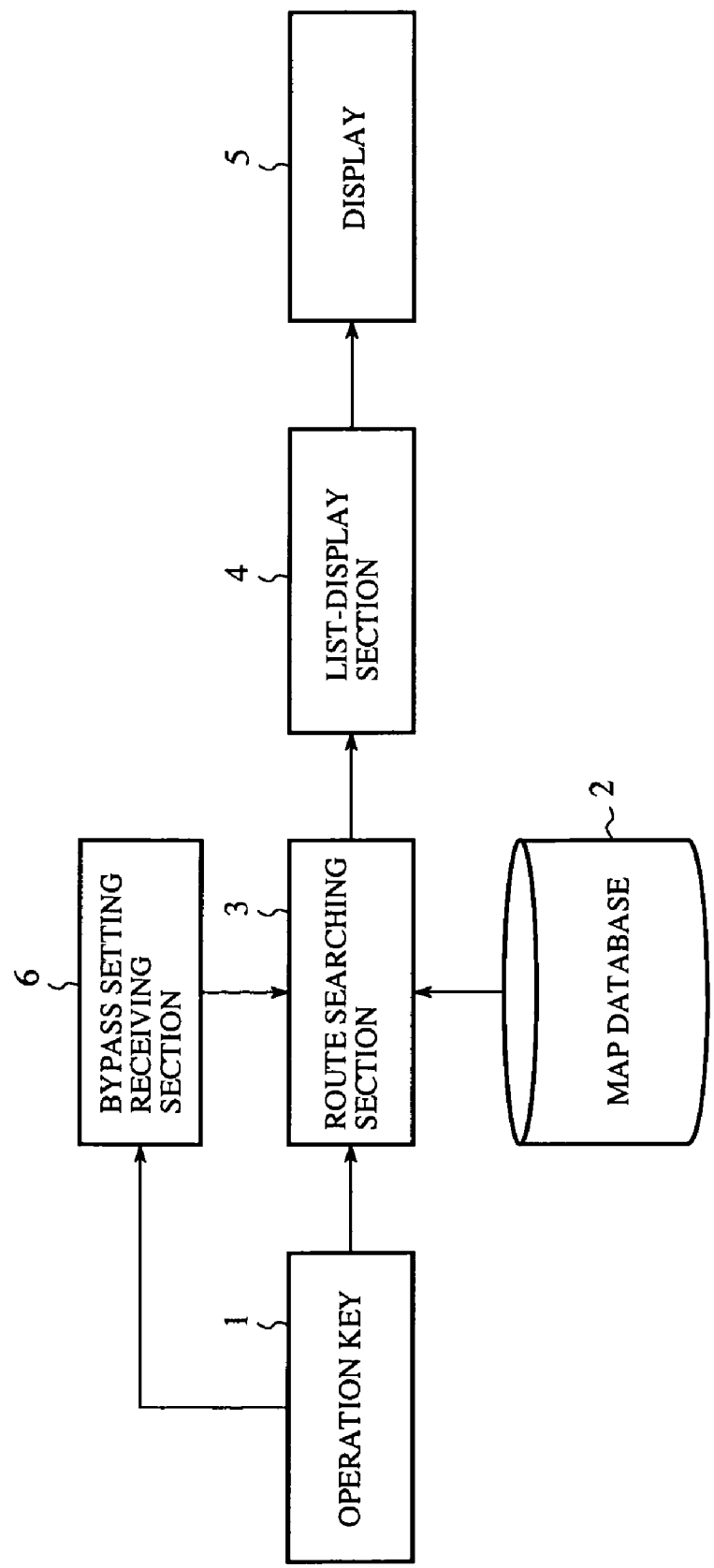
FIG. 1 shows a navigation device according to a first embodiment of the present invention.

FIG. 1 shows a navigation device according to a first embodiment of the present invention. In the figure, reference numeral 1 denotes an operation key which is operated when a user set a destination or the like. 2 is a map database which stores map data. 3 is a route searching section which searches an optimal route to a destination referring to the map database 2 when the destination is set using the operation key 1. A route searching means is constituted by the map database 2 and the route searching section 3.

4 is a list-display section which lists guide points on the route searched by the route searching section 3 and displays the guide points on a display 5. 5 is a display on which a list of the guide points are displayed. A list display means is constituted by the list-display section 4 and the display 5.

6 is a bypass setting receiving section receiving means) which receives a bypass setting for a section connecting two guide points or an arbitrary guide point. The bypass setting receiving section 6 outputs a command for re-searching of the route to the destination to the route searching section 3 on receiving the bypass setting.

Next, the operation of the navigation device according to the first embodiment will be described below.

Firstly, when a user sets a destination using the operation key 1, the route searching section 3 searches an optimal route to the destination referring to the map database 2.

In this manner, a guide map showing the route to the destination is displayed on the display 5. In order to assist in understanding the route to the destination, the list-display section 4 lists the guide points on the route searched by the route searching section 3 (for example, intersections on the route) and displays such guide points on the display 5.

Figure 2:
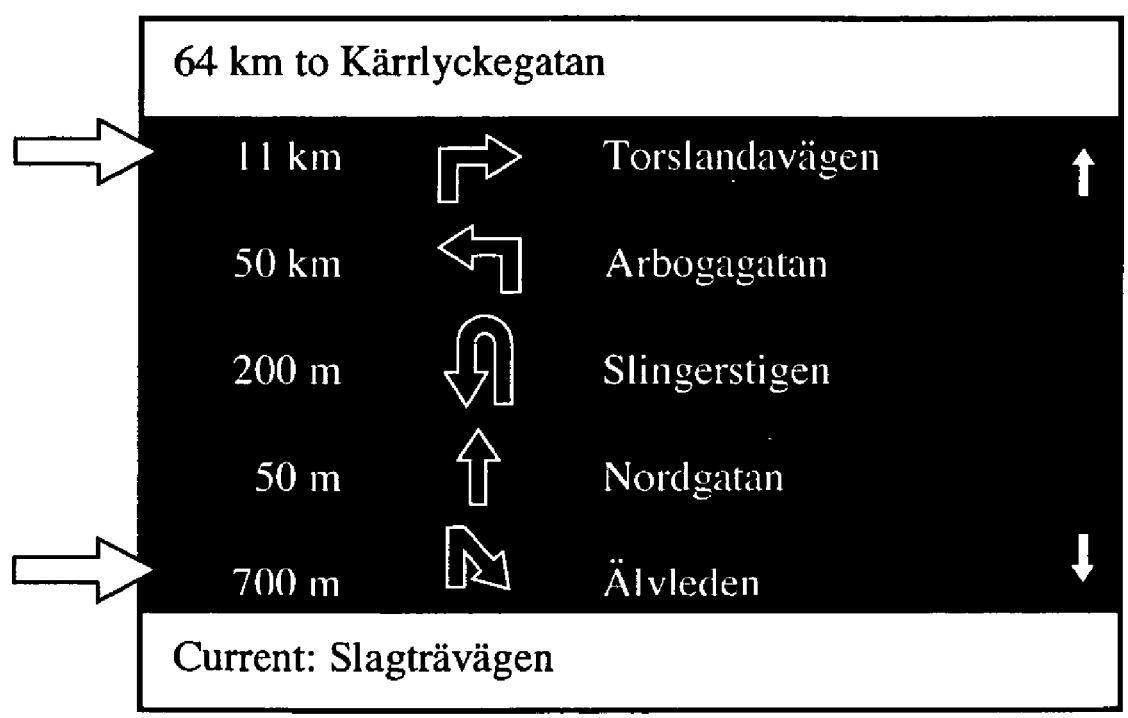
FIG. 2 describes an example of displaying a listing of guide points.

FIG. 2 describes an example of displaying a list of guide points. In this example, five guide points are displayed, the distance to the guide points and the direction of traffic at the guide points are also displayed.

However, when a user desires to bypass passing through a section connecting arbitrary guide points for some reason, it is possible to request re-searching of the route by performing a bypass setting with the operation key 1.

For example, when it is desired to bypass the section connecting the first to the fifth guide points, the first guide point and the fifth guide point are designated with the operation key 1 as shown in FIG. 2, and the bypass setting receiving section 6 receives a bypass setting with respect to the section connecting the first to fifth guide points. As a result of receiving the bypass setting, the bypass setting receiving section 6 outputs the result of setting to the route searching section 3 and commands the route searching section 3 to re-search the route to the destination.

It is noted that when it is desired to bypass a section across a plurality of guide points in the conventional navigation device described above, it is necessary to perform a bypass setting on the second guide point, the third guide point and the fourth guide point as a result of the fact that the plurality of guide points must be designated individually.

As a result, the route searching section 3 searches a route which does not contain the section connecting the first to the fifth guide points, and displays a guide map showing that route on the display 5. Furthermore, in the same manner as the above, the list-display section 4 lists the guide points on the route searched by the route searching section 3 and displays those guide points on the display 5.

As clearly shown by the foregoing description, in the first embodiment, when a bypass setting on a section connecting arbitrary guide points is received by the bypass setting receiving section 6, the route searching section 3 re-searches a route to a destination in accordance with the setting. Thus, the advantageous effect is obtained that even when it is desired to bypass a section across a plurality of guide points, it is possible to search a route bypassing the section connecting arbitrary guide points without designating the plurality of guide points individually.

EMBODIMENT 2

In the first embodiment described above, a bypass setting for a single section is received. However, the navigation device may be adapted to receive a bypass setting for a plurality of sections, the same advantageous effect as the first embodiment is also obtained in such a case.

However, when receiving the bypass setting for a plurality of sections, it is required to confirm whether the designated portion is the front of the section or the rear of the section. Therefore, for example, a key "A" in the operation key 1 is used as a key to allocate the front of the section and a key "B" in the operation key 1 is used as a key to allocate the rear of the section.

EMBODIMENT 3

In the first embodiment described above, a bypass setting for an arbitrary section is received. However, the navigation device may be adapted such that the bypass setting receiving section 6 receives a bypass setting for an arbitrary guide point.

That is to say, a mode for receiving a bypass setting for an arbitrary section and a mode for receiving a bypass setting for an arbitrary guide point are prepared, a user can select an arbitrary mode in order to perform a bypass setting on the arbitrary section or a bypass setting on the arbitrary guide point.

In this manner, the advantageous effect is obtained that it is also possible to search a route which bypass the arbitrary guide point.

EMBODIMENT 4

Figure 3:
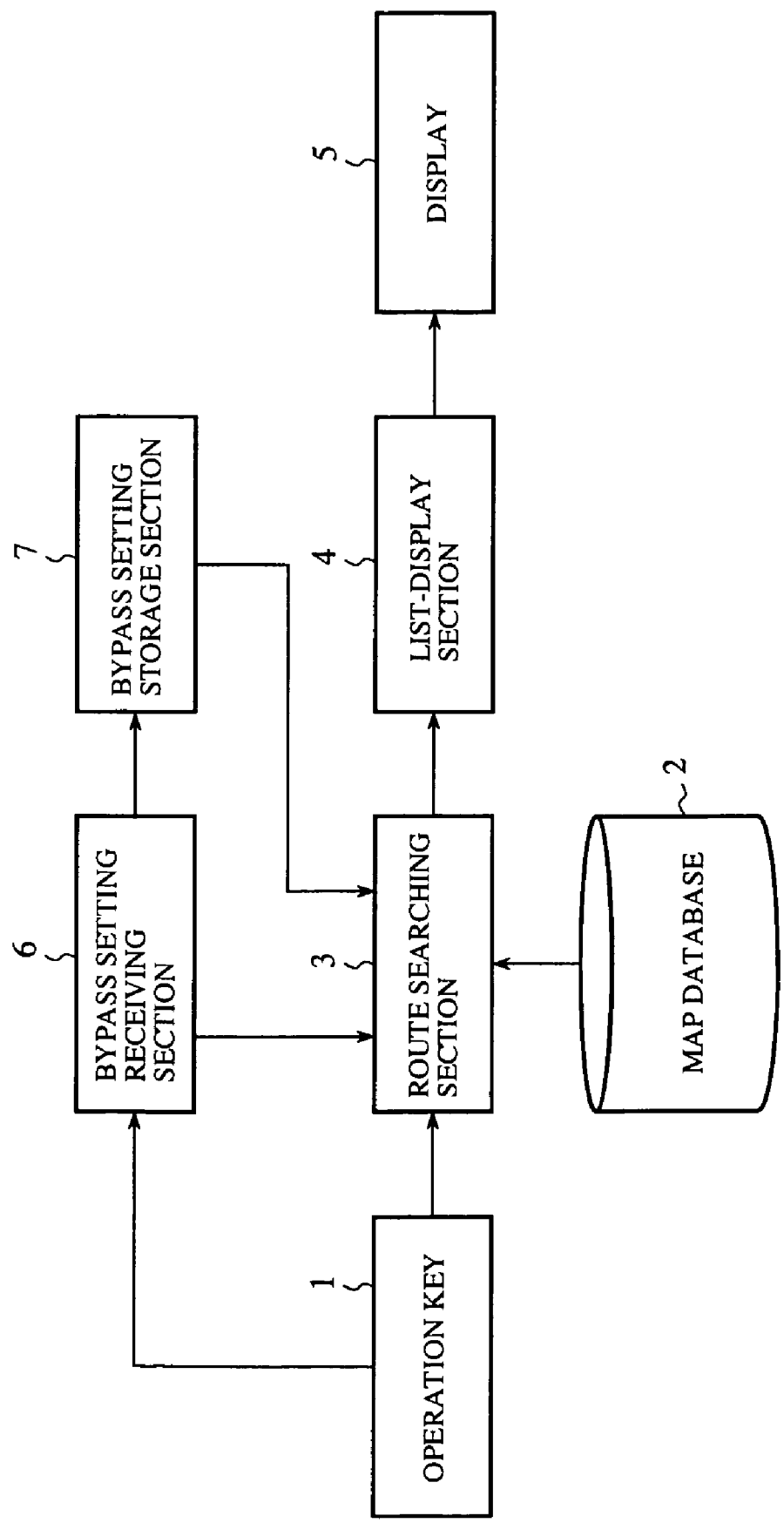
FIG. 3 shows a navigation device according to a fourth embodiment of the present invention.

FIG. 3 shows a navigation device according to a fourth embodiment of the present invention. In the figure, components which are the same as or similar to those described with reference to FIG. 1 are designated by the same reference numerals and additional description is omitted.

Reference numeral 7 denotes a bypass setting storage section (storage means) which stores bypass settings received by the bypass setting receiving section 6.

Next, the operation of the navigation device according to the fourth embodiment will be described below.

In the first to third embodiments, when a user uses the operation key 1 to set a destination, the route searching section 3 searches an optimal route to the destination referring to the map database 2. On the other hand, in the fourth embodiment, the navigation device is adapted such that the bypass setting storage section 7 stores previous bypass settings received by the bypass setting receiving section 6. Thus, when the route searching section 3 searches a route to the destination, the route can be searched referring to the previous bypass settings stored in the bypass setting storage section 7.

In this manner, the advantageous effect is obtained that once a bypass setting is performed, it is possible to search a route bypassing an arbitrary guide point or a section connecting arbitrary guide points without subsequent bypass settings.

EMBODIMENT 5

Figure 4:
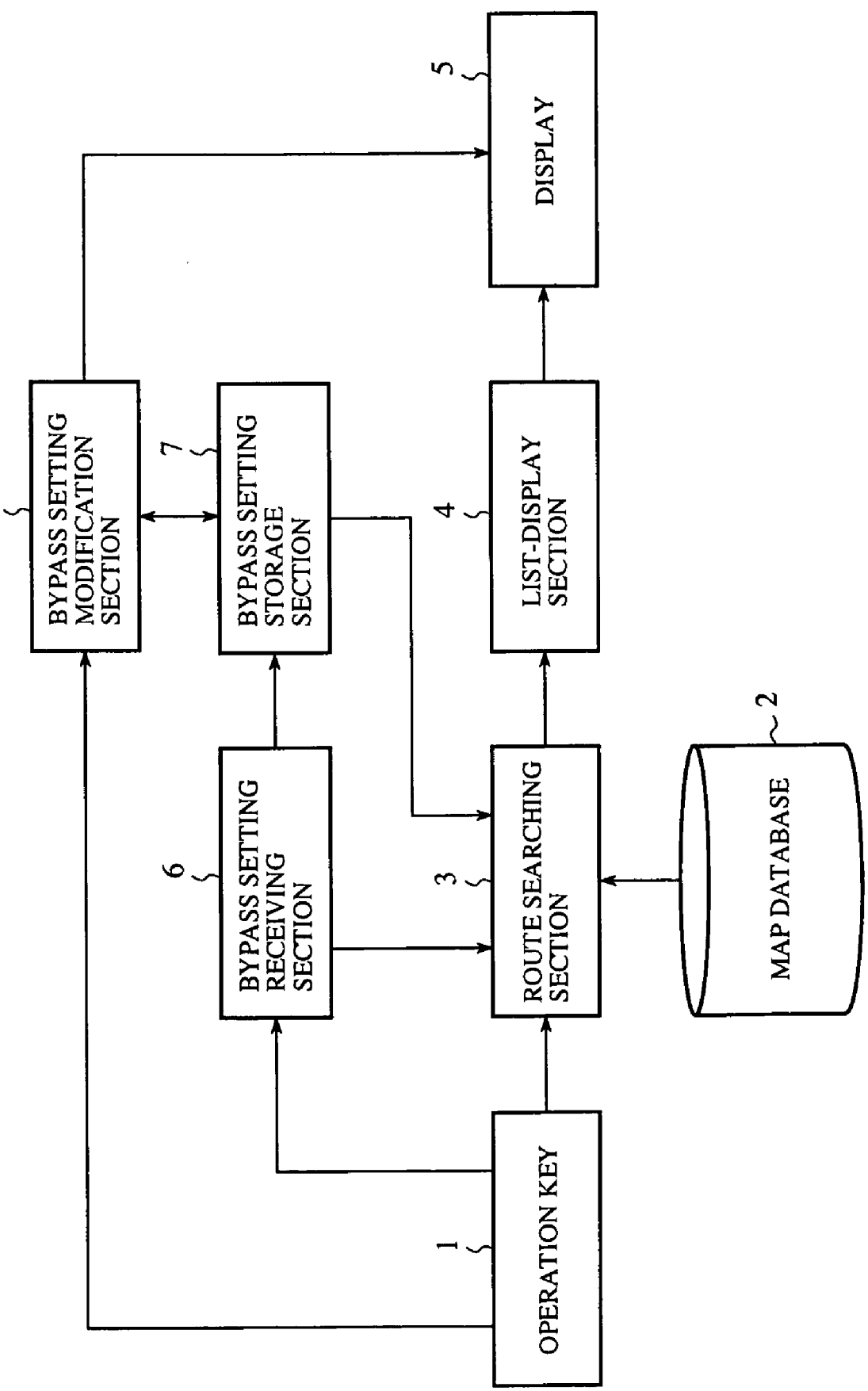
FIG. 4 shows a navigation device according to a fifth embodiment of the present invention.

FIG. 4 shows a navigation device according to a fifth embodiment of the present invention. In the figure, components which are the same as or similar to those described with reference to FIG. 3 are designated by the same reference numerals and additional description is omitted.

Reference numeral 8 denotes a bypass setting modification section (modification means) which displays bypass settings stored in the bypass setting storage section 7 on the display 5 and which receives modifications to the bypass settings.

Next, the operation of the navigation device according to the fifth embodiment will be described below.

In the fourth embodiment described above, the bypass setting storage section 7 stores previous bypass settings received by the bypass setting receiving section 6, and the route searching section 3 refers to the previous bypass settings stored in the bypass setting storage section 7 when searching a route to the destination. On the other hand, in this fifth embodiment, the bypass settings stored in the bypass setting storage section 7 are displayed on the display before the route searching means 3 searches the route to the destination (refer to FIG. 5), and modifications to the bypass settings are received by the bypass setting modification section 8.

In this manner, the advantageous effect is obtained that it is possible to confirm a bypass condition before searching the route to the destination. Furthermore, since it is possible to modify the bypass setting by merely selecting "perform" or "non-performance" of the bypass, the advantageous effect is obtained that it is possible to modify the status of the bypass in a simple manner. That is to say, since it is possible to modify the status of the bypass without a resetting or deletion operation on the bypass setting, it is possible to simply modify the set details of the bypass in accordance with the current condition.

EMBODIMENT 6

In the fourth and fifth embodiments described above, the bypass setting storage section 7 stores previous bypass settings received by the bypass setting receiving section 6. However, as shown in FIG. 6, the bypass setting storage section 7 may add a bypass date and time to the bypass setting.

In this manner, the advantageous effect is obtained that it is possible to set the status of the bypass considering the date and time of previous bypass settings. That is to say, even in the event of section which experiences chronic traffic congestion, since congestion in such a section depends on the time of day, it is possible to set the status of the bypass in extreme detail considering the date and time of the previous bypass settings.

INDUSTRIAL APPLICABILITY

As shown above, a navigation device according to the present invention is adapted to re-search a route to a destination upon receipt of the bypass setting for geographical points when it is desired to bypass certain geographical points. This may be the case for example when there are points of high traffic congestion on the route to the destination.

What is claimed is:

1. A navigation device, comprising:
a route searching means which, when at anytime requested by a user, searches an entire route to a destination when the destination is set,
a list-display means which lists and displays guide points on the entire route searched by the route searching means,
a receiving means which, upon designating at least two of said guide points, receives a bypass setting for a section connecting the at least two guide points when the list-display means lists and displays the guide points on the entire route, and
a storage means which stores the bypass setting received by the receiving means, and wherein when said route searching means searches the entire route to the destination, said route searching means refers to the bypass settings stored in the storage means;
wherein when said receiving means receives the bypass setting for the section connecting the at least two guide points, said route searching means re-searches the route to the destination in accordance with the setting result and said display means displays an updated list of guide points based on the researched route.

2. The navigation device according to claim 1, wherein said receiving means receives a bypass setting for an arbitrary guide point.

3. The navigation device according to claim 1, further comprising a modification means which receives modifications on the bypass settings while indicating the bypass settings stored in the storage means.

4. The navigation device according to claim 3, wherein said modification means indicates the bypass settings stored in the storage means before the route searching means searches the entire route to the destination.

5. The navigation device according to claim 3, wherein said storage means stores the bypass setting to which a bypass time and date are added.

6. The navigation device according to claim 1, wherein the list display means lists for each guide point a distance between each guide point, a symbol indicating traffic characteristics at each guide point, and an identification of each guide point.

7. A method for searching a route in a navigation device, comprising:
inputting entire route information in the navigation device at anytime by a user;
searching an optimal route based on map data stored in a map database and the inputted entire route information;
retrieving from the map database one or more guide points associated with the optimal route;
listing the one or more guide points on a display;
determining by the user whether to select a bypass setting based on the listed guide points, the bypass setting indicating which guide points should be bypassed;
performing an updated search of the optimal route based on the bypass setting;
storing a selected bypass setting in a memory for retrieval during route searching; and
displaying an updated list of guide points based on the updated optimal route.

8. The method of claim 7, wherein one or more sections of the optimal route defined by the guide points may be bypassed.

9. The method of claim 7, further comprising providing a date and time stamp for each stored bypass setting.

10. A navigation apparatus, comprising:
an operation key by which a destination is set at anytime by a user;
a map database that stores map data;
a route searcher operatively connected to the map database and the operation key, the route searcher determining an optimal route based on the destination set by the user from the stored map data from the map database;
a display operatively connected to the route searcher, the display displaying a list of guide points located on the entirety of the optimal route; and
a bypass receiver operatively connected to the route searcher and said operation key, the bypass receiver receiving a bypass setting based on a user selection of one or more guide points to bypass; and
a bypass storage device operatively connected to said route searcher that stores the bypass setting for retrieval by said route searcher during route searching;
said route searcher performing an updated search of the optimal route based on the bypass setting and provides the updated optimal route to said display, where said display displays an updated list of guide points based in the updated optimal route.

* * * * *